(12) United States Patent
Deibel et al.

(10) Patent No.: US 6,716,361 B2
(45) Date of Patent: Apr. 6, 2004

(54) RENEWABLE FILTER

(75) Inventors: Richard J. Deibel, Bamberg, SC (US); Patrick M. Dugan, Lake Wylie, SC (US)

(73) Assignee: Dei-Tec Corporation, West Columbia, SC (US)

( * ) Notice: Subject to any disclaimer, the term of this patent is extended or adjusted under 35 U.S.C. 154(b) by 0 days.

(21) Appl. No.: 10/369,031

(22) Filed: Feb. 18, 2003

(65) Prior Publication Data

US 2003/0127402 A1 Jul. 10, 2003

Related U.S. Application Data

(60) Division of application No. 09/660,969, filed on Sep. 13, 2000, now Pat. No. 6,568,539, which is a division of application No. 09/373,438, filed on Aug. 11, 1999, now Pat. No. 6,221,242, which is a continuation-in-part of application No. 08/951,387, filed on Oct. 16, 1997, now Pat. No. 6,228,274.
(60) Provisional application No. 60/033,387, filed on Dec. 17, 1996.

(51) Int. Cl.[7] .............................................. B01D 29/66
(52) U.S. Cl. ..................... 210/797; 210/798; 134/22.18
(58) Field of Search .................... 210/791, 797, 210/798, 443, 444, 445, 453, 454, 493.2, 489, 497.3, 499, DIG. 17; 134/22.1, 22.18, 24

(56) References Cited

U.S. PATENT DOCUMENTS

| | | | | |
|---|---|---|---|---|
| 3,044,475 A | * | 7/1962 | Thompson | 134/102.1 |
| 3,057,481 A | * | 10/1962 | Pall | 210/493.5 |
| 3,458,050 A | * | 7/1969 | Cooper | 210/448 |
| 3,934,238 A | * | 1/1976 | Pavlou | 340/611 |
| 3,954,625 A | * | 5/1976 | Michalski | 210/445 |
| 4,259,419 A | * | 3/1981 | Uba et al. | 429/174 |
| 4,304,663 A | * | 12/1981 | Manders | 210/90 |
| 4,372,848 A | * | 2/1983 | Manders | 210/90 |
| 4,558,957 A | * | 12/1985 | Mock et al. | 368/294 |
| 4,872,976 A | * | 10/1989 | Cudaback | 210/130 |
| 5,783,078 A | * | 7/1998 | Roll et al. | 210/444 |
| 6,221,242 B1 | * | 4/2001 | Deibel et al. | 210/133 |
| 6,228,274 B1 | * | 5/2001 | Deibel et al. | 210/798 |
| 6,568,539 B1 | * | 5/2003 | Deibel et al. | 210/443 |

FOREIGN PATENT DOCUMENTS

| | | | |
|---|---|---|---|
| DE | 3429634 | * | 2/1986 |
| GB | 1324776 | * | 7/1973 |
| GB | 1355832 | * | 3/1989 |
| JP | 08100622 | * | 4/1996 |
| WO | WO 89/01815 | * | 3/1989 |

* cited by examiner

*Primary Examiner*—Matthew O. Savage
(74) *Attorney, Agent, or Firm*—Brinks Hofer Gilson & Lione (57) ABSTRACT

A twist-on renewable filter comprising a one-piece hollow housing, made of polymeric material having a threaded adapter for attachment to a distribution head assembly. The filter housing is fabricated from components that are made of a polymeric material that are fused together to form the one-piece hollow housing. A filter media assembly is rigidly bonded at both ends within the housing. The renewable filter has an infinite life and can be removed and cleaned, for example, by reverse flushing the filter with a cleaning solution. A bypass valve 250 is provided within the filter that is designed to provide full closure for an infinite life. The bypass valve 250 is fully located within the one-piece hollow housing such that it cannot be disabled or tampered with. The bypass valve 250 functions to allow sufficient fluid to bypass the filter media when the filter media has become contaminated and will not permit the full volume of the normal oil stream to be filtered. The bypass valve 250 has the capacity to permit the full volume of the normal oil stream to bypass the filter media when necessary, for example, during a cold start.

2 Claims, 5 Drawing Sheets

RENEWABLE FILTER

RELATED APPLICATIONS

This application is a divisional of U.S. patent application Ser. No. 09/660,969 filed on Sep. 13, 2000, now U.S. Pat. No. 6,568,539, which is a divisional of U.S. patent application Ser. No. 09/373,438, filed on Aug. 11, 1999, now U.S. Pat. No. 6,221,242, which is a continuation-in-part of U.S. patent application Ser. No. 08/951,387, originally filed on Oct. 16, 1997, now U.S. Pat. No. 6,228,274, which claims the benefit of U.S. Provisional Application, Serial No. 60/033,387 filed on Dec. 17, 1996.

BACKGROUND OF THE INVENTION

1. Field of the Invention

The present invention relates generally to filtering devices. In particular, the present invention relates to a renewable spin-on type filter having a high strength plastic housing.

2. Discussion of Background

Spin-on, twist-on type filters are used in numerous liquid and pneumatic applications throughout the agricultural, transportation, commercial and industrial markets. The housing or can for most spin-on disposable filters are manufactured from malleable materials, such as aluminum, by a deep-draw forming process. This technique limits the structural capabilities of current spin-on and twist-on type disposable products to the production capabilities of the metal forming industry and to the molecular characteristics of a limited number of specific malleable metals. Prior art disposable filters use stamped steel or cast cover plates to secure the housing or can to a mounting and distribution head assembly. This plate typically has a threaded center hole and is spot-welded and/or crimp-sealed to a deep drawn can. The purpose of the cover plate is to provide a mounting section that contains sufficient strength to allow operation of the filter at the required pressure rating. These prior art techniques for sealing and connecting the can to the plate, plus the structural limits of thin gauge malleable metals, restrict the application and uses of prior art spin-on, twist-on disposable filters. Recently, new high pressure, high burst strength disposable filter housings with burst pressure ratings in the 1000 psi range have been developed for some narrowly defined markets and applications. However, even these newer, high-strength filters remain applicationally limited because of their continued use of deep-drawn metal cans.

The filter media used in the prior art are usually paper products that are flexible and flimsy. As a result of their flexible and flimsy characteristics, these filters often are not properly secured in place within the housing or can during the assembly of the filter. By some accounts, 50% of current commercially available oil filters are defective and thus do not perform up to specification. Also, prior art paper filters often develop rips or tears during use. For example, if there is a spike in the pressure of the fluid being filtered, paper filters will often develop a rip through which unfiltered fluid flows. Such rips generally increase in size as a result of the rush of fluid flow there through. Such defects are not visible and unknown to the machine operator and the use of the filter continued for its normal use period during which improperly filtered oil is re-circulated through the machine or engine. Serious damage to the machine or engine can result. Once these disposable filters have been severed, they can no longer serve their purpose and should be replaced.

When conventional filters reach the end of their useful life, the filter is removed from the vehicle or machine and the remaining filtrate, usually oil, is drained and a new filter is installed. Thereafter, the filter should be compacted and disposed of in accordance with industry practice. However, often the used filter is disposed of in a way that it is eventually placed in a land fill. The impact on the environment from the disposal of used filters and oil is devastating to the environment. The enormity of this problem is realized when the variety of industrial and consumer applications that employ disposable filters, as well as the frequency with which these filters are replaced, is considered. The impact on the environment can be appreciated when it is realized that there are currently about 180,000,000 vehicles in the United States for which it is recommend that the filter and oil be changed every 3,000 miles. About 400,000,000 oil filters are manufactured in the U.S. each year, of which less than 25% are properly recycled. The remaining, which retain some oil, are disposed of and this used oil enters the environment. Even properly drained oil filters can retain up to 8 ounces of used oil. It is estimated that the result of proper recycling would result in the recovery of more than 17,000,000 gallons of oil. If properly processed, this oil could be reused.

Therefore, there exists a need for a twist-on filter that is renewable which would support and encourage the recycling of used oil and reduce environmental liability.

If an oil filter is not serviced, it can become clogged and the flow of incoming oil will be impeded and eventually completely stop from passing through the filtering media. When the filter becomes blocked with contaminates, fluid flow is restricted and diminished and the differential pressure across the filter element increases. As the volume of the flow diminishes, parts of the machine or engine that normally receive lubrication will receive inadequate lubrication. The typical lubrication systems for an internal combustion engine pump oil from a sump through a loop, splashing oil over and around moving engine parts, such as the valves and piston rods. The oil filter is a component through which the oil flows in this oil flow loop. Thus, if the oil filter becomes clogged, the flow of oil is impeded and lubrication becomes inadequate. However, the damage to an engine or machine will be less if the circulation of the contaminated oil is continued rather than allowing the circulation of oil to be stopped. Thus, it is important that a bypass be provided to allow the circulation of oil to continue when it cannot pass through the filter media. Also, when an engine that is in a cold environment is started, the viscosity of the crankcase oil is very high and resists being forced through the filter media. It is important, in such situations, that provisions are available to allow the oil to bypass the filter for a period while its temperature increases and its viscosity decreases. For these reasons, oil filters should have a bypass system to protect the engine in the event of a clogged filter. Bypass valves for oil filters are known. However, they are complicated, expensive and are not an integral part of the filter. There is a need for a filter device that has a simple mechanical bypass that is an integral part of the filter device and cannot be disconnected or tampered with.

A typical automotive poppet type bypass valve has a very limited surface area against which the liquid that is at an elevated pressure must react to cause the bypass valve to open. This renders the valve unreliable for its intended purpose. Also, the typical automotive poppet type bypass valve utilizes a compression spring to urge the valve closed. Compression springs are very vulnerable to premature fatigue failure. The filter of this invention has an infinite life and, thus, if the filter of this invention is provided, a built-in bypass valve should also have an infinite life. Another shortfall of the typical automotive type poppet bypass valve of the type that relies on a compression spring to return the valve to its closed position is that it is unlikely that full closure will be attained. Coil type compression springs are rounded on both ends and cannot be properly guided. As a result, compression springs take the path of least resistance when they expand. Furthermore, coil type compression springs do not exert an equal pressure over the length of their expansion and, thus, do not provide a uniform pressure on the poppet valve.

Accordingly, there is a need for a simple bypass valve that is built into a renewable filter that has an infinite life cycle to match the life cycle of the renewable filter. There is also a need for a filter having a bypass valve that has a relatively large surface against which the liquid at elevated pressure reacts to increase the reliability of the valve. Still further, there is a need for a filter having a bypass valve that does not rely upon a coil type compression spring to close the valve. There is also a need for a renewable filter having an integral bypass valve that, when fully open, has the capacity to bypass the full volume of the normal oil flow.

SUMMARY OF THE INVENTION

According to its major aspects and briefly stated, the present invention is a renewable twist-on filter that is made from a sealed polymeric, unitary housing that has a filter media assembly securely bonded in place within the interior of the housing. After a use period that can be measured either in elapsed time or, for automotive uses, in miles traveled, the filter will be removed and replaced. The filter that has been removed will then be cleaned, after which it is put back into circulation for another use period. The filter housing is plastic welded together and, thus, would be destroyed if it is opened or tampered with. The filter is designed to last for an unlimited time and is designed to withstand pressures in excess of three times the normal operating pressure that it is expected to be exposed to. In one embodiment of the invention, a bypass valve is built into the interior of the housing to allow circulation of the fluid to continue in the event, for example, that the filter becomes contaminated or in the event of a cold start. The filter housing carries a metallic adapter having machined threads for securing the filter housing to an engine or machine. Adapters can have internal or external threads and be of various sizes and thread types. It is also contemplated that this adapter could be formed of plastic material.

The housing formed from a hollow polymeric container. In a preferred embodiment, there is a polymeric container member having an open top and a polymeric top member that are plastic welded together to thus provide a closed housing having an interior chamber. The filter media is fabricated from multiple layers of metal mesh material and, thus, is a rigid stable item which assures that, in the assembly process, it is properly located. During the assembly process, the filter media is bonded in place within the interior chamber and its position within the chamber is assured by plastic welding of the container member to the top member. The assembly procedure guarantees the initial proper location of the filter media assembly and the plastic welding assures that this location will be maintained. Thus, the top member is fused to the hollow polymeric container and this assembly now functions as a closed housing having an interior chamber within which is securely attached the filter media assembly. It should be noted that, although the preferred embodiment discloses a housing formed from a cup-shaped member that is closed by a disc-shaped top member, the top member need not be disc-shaped but rather could also be cup-shaped. It should also be noted that, although the hollow polymeric container or cup-shaped member is disclosed as being a unitary cast part, it could also be fabricated from a section of polymeric tube having a molded bottom end member bonded or welded thereto. The essential feature being that the components from which the hollow housing are formed are welded together to form a closed housing having an interior chamber within which is securely attached the filter media assembly. The filter media assembly is secured by adhesive at both ends within the housing such that the filter media assembly is immovable relative to the housing. The bottom of the filter media assembly is secured to the bottom or closed interior end of the housing by an adhesive material. The top of the filter media assembly is also bonded to a media collector plate that is connected to the inner surface of the top member. The filter media assembly divides the interior chamber of the housing into an inlet section and a discharge section. The filter media assembly could be any type that is commonly employed in the art provided it is capable of being cleaned and subsequently reused.

The preferred embodiment of the filter media assembly formed from three layers of metal mesh material. Each layer is cut to a shape having a pair of edges that, when joined by a weld or encapsulated by adhesive, cause the flat piece of material to assume the shape of a cone. The metal mesh material is folded or pleated radially such that, after the edges are joined, the filter is in the shape of a truncated cone having continuous top and bottom edges. The pleats extend from the top continuous edge to the bottom continuous edge. The surface area of the filter media assembly is greatly increased by such a filter design. The inner and outer metal mesh material layers are formed of relatively large stainless steel wire and have relatively large openings. These layers of metal mesh function mainly as supports and protection for the central layer which formed from much smaller wires and has very small filtering openings. An important function performed by the heavy gauge inner and outer layers is to assure that the pleats of the central layer do not collapse upon each other to form a double layer.

When the filter requires cleaning, it is removed from the distribution head of the vehicle or machine, and the excess fluid contained therein is drained out. This small amount of drained fluid can be easily disposed of in a manner that is not detrimental to the environment. Thereafter, the filter is back flushed using a cleaning solution. Once cleaned, the filter may be dried prior to reuse by allowing it to stand for a period of time or by blowing a drying gas therethrough. As a result of using the highly efficient and reliable filter, it is not necessary to change the oil each time the filter is cleaned. Test vehicles have currently exceeded 12,000 miles without an oil change and test of the oil shows little deterioration.

A major feature of the present invention is the unitary design of the polymeric housing.

Still another feature of the present invention is the combination of a polymeric housing and a renewable filter media assembly. This combination enables the filter to be cleaned and recycled which, in turn, significantly reduces the deleterious impact on the environment.

Another significant feature of this invention is the provision of a filter that has been provided having a bypass valve within the confines of the filter that requires no external conduits or accessories. This bypass valve, like the filter, has been designed for an infinite life cycle. The closure member for the bypass valve is maintained in a precise disposition as it is compressed as a result of it being guided by the outer surface of a brass adapter. This assures a full closure of the valve. Applicant's stainless steel spring engages the closure member at a plurality of equally spaced locations to exert a force on the closure member causing it to slide smoothly without binding along the smooth outer annular surface of the threaded adapter. As a result applicant's bypass valve will always return to its full closed position. The closure member of the bypass valve has a reaction surface area that is sufficient to insure that when fully open the bypass valve can bypassing the full volume of the normal oil flow. This is particularly important in cold start situations since it permits the full flow of unfiltered oil.

Other features and their advantages will be apparent to those skilled in the art from a careful reading of the detailed description of the preferred embodiments accompanied by the following drawings.

DETAILED DESCRIPTION OF THE PREFERRED EMBODIMENT

Figure 1:
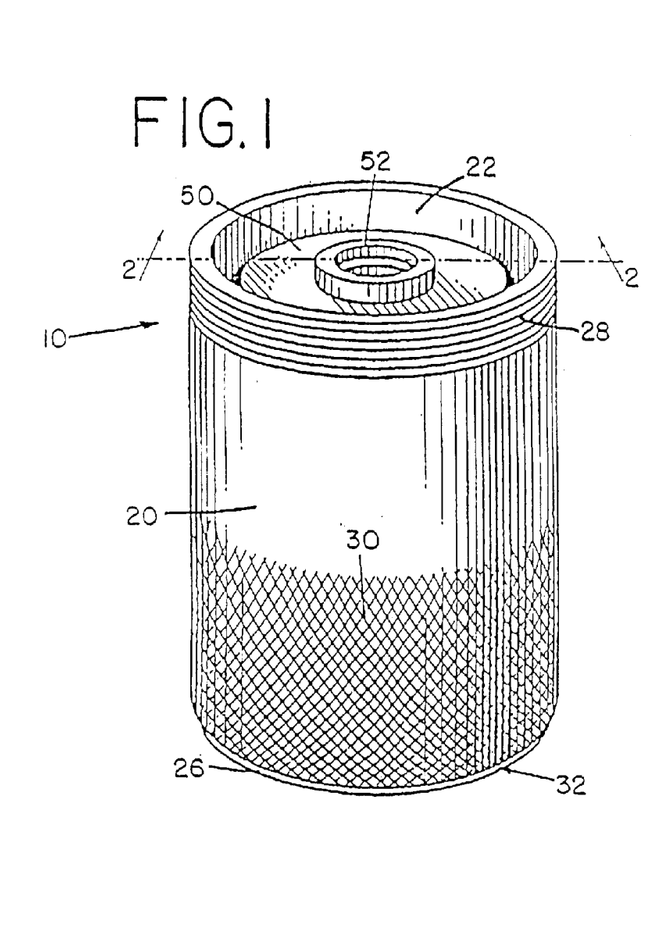
FIG. 1 is a perspective view of an embodiment of the present invention.
Figure 2:
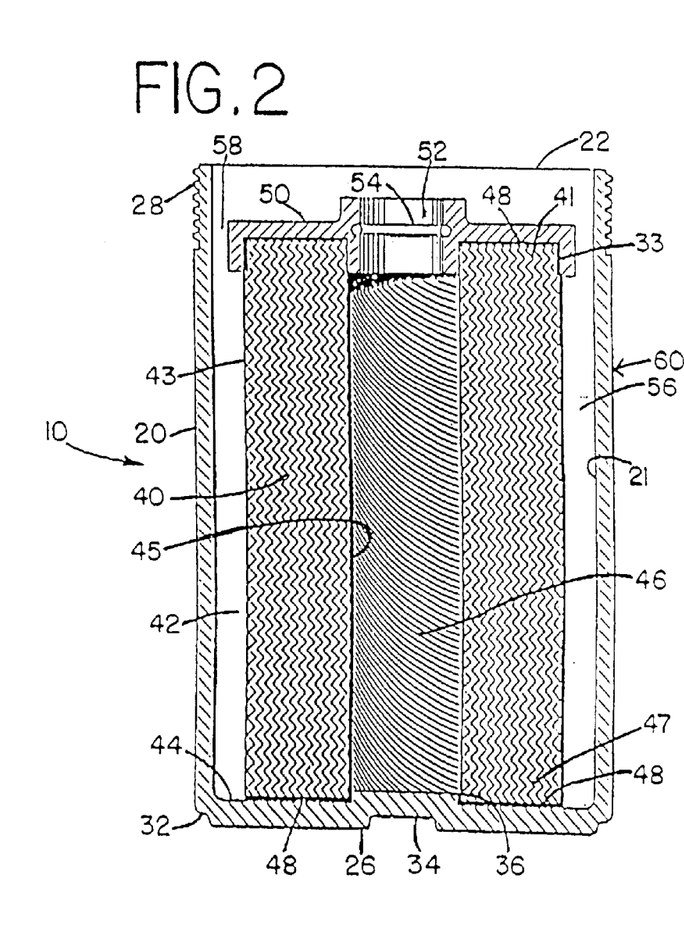
FIG. 2 is a cross-sectional side view of the embodiment of the present invention taken along lines 2—2 of FIG. 1.

The present invention provides a renewable, spin-on type tube filter designed to remove contaminates from a lubricant or other industrial fluid. The filter media assembly advanced by the present invention is suitable for use in a wide variety of industrial applications. Referring now to FIGS. 1 and 2, there is shown a perspective view and a cross-sectional view, respectively, of a filter according to one embodiment of the present invention and generally designated by reference numeral 10. Filter 10 is comprised of a hollow housing 20 having a top end portion including a top member 50 and a bottom end portion. The hollow housing 20 has an interior chamber that is divided by filter media assembly element 40 into an inlet section and a discharge section. Housing 20 comprises a hollow polymeric container 60 having a bottom or closed-end 26 and an open-end 22. Inner wall 21, floor or bottom surface 44 and the internal surface of top member 50 define the interior chamber 42 of hollow housing 20.

An external thread 28 formed about the perimeter of hollow polymeric container 60 proximate to open-end 22. Thread 28 may be manufactured to any size which, in turn, enables filter 10 to achieve the specific pressure rating required by the particular application. Thread 28 formed to removably mate with a variety of distribution heads commonly used in industry thereby enabling filter 10 to be employed in a variety of industrial applications.

Hollow polymeric container 60 is made of any polymeric material that can operate in a temperature range between approximately −40° C. and 190° C. without experiencing thermal degradation. Hollow polymeric container 60 can be formed to assume any thickness and length. The dimensions of hollow polymeric container 50 are selected to provide a stable structure at its intended operating temperature and pressure. Preferably, hollow polymeric container 60 is made of a polymeric material impregnated with a quantity of glass fibers. Extending from the bottom or closed-end 26 about the perimeter of hollow polymeric container 60 is a series of serration's 30 designed to permit an individual to grasp housing 20. Formed about the perimeter of bottom or closed-end 26 is an annular groove 32. A circular recess 34 formed at the center of bottom or closed-end 26.

Extending into the interior 42 of hollow polymeric container 60 from floor 44 is an annular shoulder 36. Shoulder 36 is dimensioned to fit within the annular center 46 defined by filter element 40. Shoulder 36 serves to center filter element 40 within interior 42 of hollow polymeric container 60. As best seen in FIG. 2, the peripheral edge of top member 50 is spaced from the inner wall 21 of the hollow polymeric container 60 which defines an annular opening that functions as the industrial fluid outlet 58. Filter element 40 may be fabricated of any filter medium commonly employed in the art including, but not limited to, stainless steel mesh, polyesters and cellulosic materials. The mesh or porosity of the filter media 40 is determined by industrial fluid and operating conditions to which they will be exposed. The stiffness of the filter must be sufficient such that it maintains its geometric integrity and will not flex or deform when exposed to normal operating conditions and/or to back flushing. Filter element 40 has an inlet surface 45 that is in fluid communication with the throughhole or industrial fluid inlet 52 and an outer or outlet surface 43 that is in fluid communication with the industrial fluid outlet 58. If filter 40 is constructed of bendable or flexible material, a perforated annular core, made of metal or polymer, may be required so that filter element 40 maintains its geometric integrity. Filter element 40 is tubular and has an endless bottom or closed-end portion edge 47 and an endless top or open-end portion edge 41. The filter element 40 is secured along its bottom or closed-end portion edge 47 to floor 44 by an adhesive, potting or bonding material 48. The filter element 40 is secured along its top or open-end portion edge 41 in an annular groove 33 formed in the bottom surface of top member 50 using bonding material 48. The annular groove 33 is located between the industrial fluid inlet 52 formed in top member 50 and the industrial fluid outlet 58 formed by the peripheral edge of top member 50 and inner wall 21 of the hollow polymeric container 60 and, thus, isolates the industrial fluid inlet 52 from the industrial fluid outlet 58. As a consequence of this isolation, the industrial fluid that enters the inlet chamber of filter 10 through the industrial fluid inlet 52 must pass through the filter element 40 to reach the discharge section that is in fluid communication with industrial fluid outlet 58. Bonding material 48 may be any type commonly employed in the art that will not react with the fluid being filtered and can withstand operating temperatures between approximately −40° C. and 190° C.

In the embodiment illustrated in FIGS. 1 and 2, top member 50 may be made of either a metal or polymer and formed to have a throughhole or industrial fluid inlet 52 in registration with annular center 46 of filter element 40. An O-ring 54 is provided in industrial fluid inlet 52 that functions as a fluid seal between throughhole or industrial fluid inlet 52 and the distribution head.

Hollow polymeric container 60 can be manufactured using any process commonly employed in the art. Preferably, housing 20 is manufactured using an injection molding process. In assembling filter 10, filter element 40 is secured to top member 50 using bonding material 48. Bonding material 48 is then applied to floor 44 of hollow polymeric container 60. Filter element 40 and top member 50 are then placed within interior 42 of hollow polymeric container 60 and secured to floor 44.

When filter 10 requires cleaning, it is removed from the distribution head and the excess lubricant is drained. Thereafter, a cleaning solution is injected into housing 20 in the direction opposite to the direction of filtration. For example, cleaning solution may be directed through industrial fluid outlet 58 into annulus 56 which is defined by outer surface 43 of filter element 40 and the inner wall 21 of hollow polymeric container 60. The injection of solution into annulus 56 effectuates the removal of particulates from filter element 40 and transports the fluid entrained particles into annular center 46 and subsequently from the interior 42 of hollow polymeric container 60. Alternatively, cleaning solution may be injected through industrial fluid inlet 52 into annular center 46 to thereby cause the removal of particulates from filter element 40 through annulus 56 and industrial fluid outlet 58 to the exterior of housing 20. An ultrasonic cleaning method could also be used for cleaning the filters 10. After cleaning, filter 10 is dried and reused.

Figure 3:
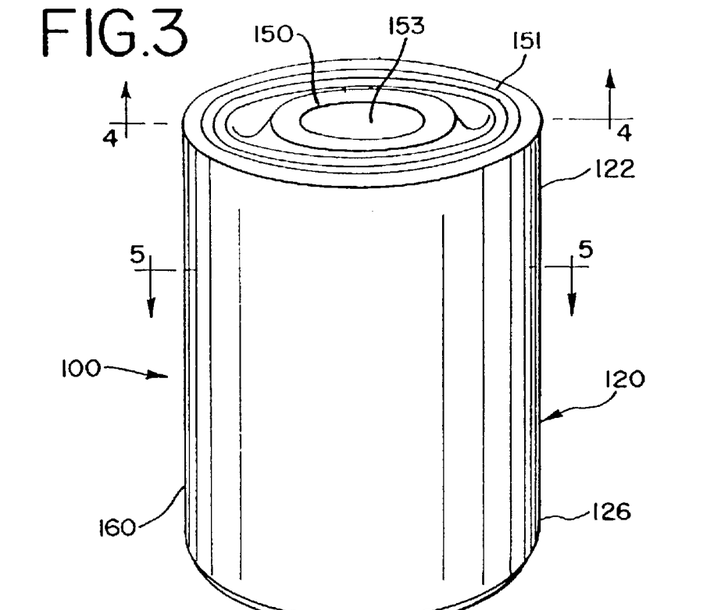
FIG. 3 is a perspective view of another embodiment of the present invention.
Figure 4:
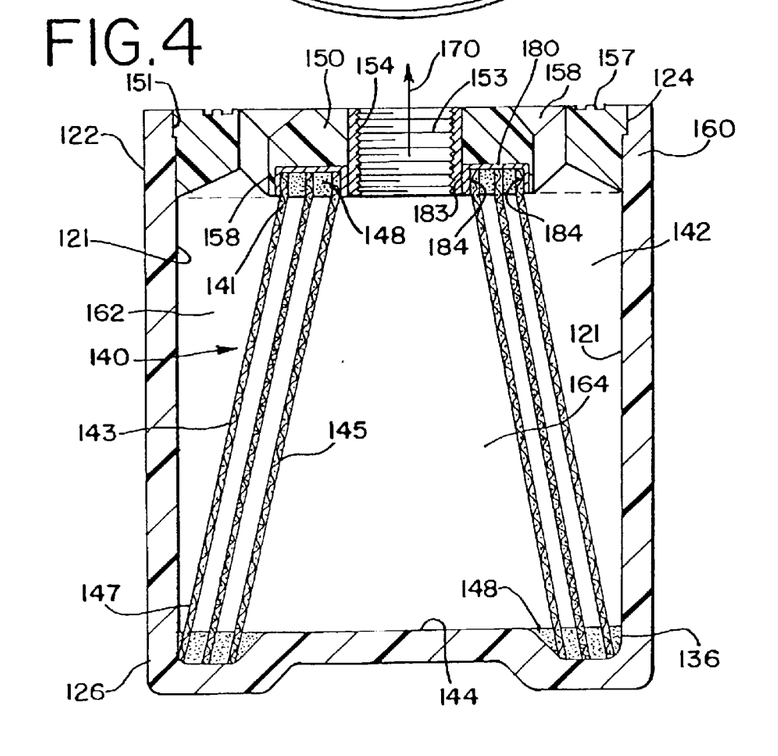
FIG. 4 is a cross-section view of the embodiment of the present invention taken along lines 4—4 of FIG. 3.
Figures 5, 6:
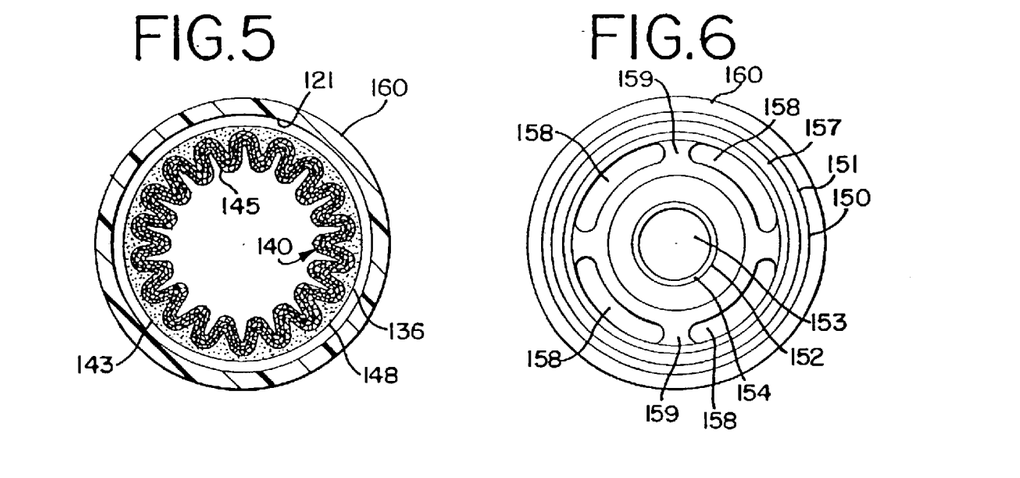
FIG. 5 is a cross-section view of the embodiment of the present invention taken along lines 5—5 of FIG. 3.
FIG. 6 is a top view of the embodiment of the present invention seen in FIG. 3.

Referring now to FIGS. 3–8 another embodiment of the present invention will be discussed. FIG. 3 is a perspective view of a filter according to this embodiment of the present invention and is generally designated by reference numeral 100. Filter 100 is comprised of a hollow housing 120 having a top-end portion, including top member 150, and a bottom-end portion 160. Cup-shaped bottom-end portion 160 and top member 150 are made of any polymeric material that can operate in a temperature range between approximately −40° C. and 190° C. without experiencing thermal degradation. In the preferred embodiment top member 150 and the bottom-end portion 160 are formed by an injection molding process using long fiber polymer composite reinforced thermoplastic material that is sold under the brand name CELSTRAN®. CELSTRAN® is a registered trademark of Hoechst Celanese Corporation. Cup-shaped bottom-end portion 160 can be formed to assume any thickness and length. It should be noted that, although this embodiment discloses a housing formed from a cup-shaped bottom-end portion 160 that is closed by a disc-shaped top member 150, the top member need not be disc-shaped but rather could be a cup-shaped top member. It should also be noted that, although the hollow polymeric container or cup 160 shaped member is disclosed as being a unitary cast part, it could also be fabricated from a section of polymeric tube having a molded bottom member bonded or welded thereto. The essential feature being that the components from which the hollow housing 120 are formed are welded together to form a closed housing having an interior chamber 142 within which is securely attached the filter media assembly 140. As best seen in FIGS. 4 and 5, which are cross-section views taken along lines 4—4 and 5—5, respectively, of FIG. 4, housing 120 has an interior chamber that is divided into an inlet section 162 and a discharge section 164 by filter media assembly 140. The filter media assembly 140 is securely mounted within the housing. The cup-shaped bottom-end portion has a bottom or closed-end 126 and an open or top-end 122. Cup-shaped bottom-end portion 160 has an interior 142 that is defined by inner wall 121 and a floor or bottom surface 144.

Filter media assembly 140 has a frusta-conical shape and has an endless bottom or-closed-end portion edge 147 and an endless top or open-end portion edge 141. The illustration of the multi-layered filter media assembly 140 is shown schematically in FIG. 4 to clearly illustrate that the filter assembly is comprised of multiple layers. In this schematic rendering, the layers are shown spaced apart from each other while in reality the layers are engaged. The filter media assembly 140 is secured along its bottom or closed-end portion edge 147 in an annular groove 136 formed in floor 144 by an adhesive bonding material 148. The filter media assembly 140 is secured along its top or open-end portion edge 141 to a filter collector member 180 which, in the preferred embodiment, is made by an injection molding process from long fiber reinforced thermoplastic material sold under the brand name CELSTRAN®. Filter collector member 180 is received in a circular groove formed in the bottom surface of top member 150. This arrangement facilitates assembly of the filter 100 and, once assembled, the endless open-end portion edge 141 of the filter media assembly 140 is, in effect, bonded along its entire extent to the open-end top member 150. Filter collector member 180 has a flat washer-shaped portion with at least one downward extending flange 184 along its peripheral edges. The central flange 184 forms a concentric central bore 183 that is sized to receive adapter 154. The filter media assembly 140 is secured by an adhesive bonding material 148 along its upper closed-end portion edge 141 in the annular groove formed by the downward extending flanges 184 of collector member 180. Filter media assembly 140 isolates the industrial fluid outlet 153 from the industrial fluid inlet 158. As a consequence of this isolation, the industrial fluid that enters the inlet section 162 of filter 100 through the industrial fluid inlet 158 must pass through the filter media assembly 140 to reach the discharge section 164 from which it is discharged through industrial fluid outlet 153.

Figure 11:
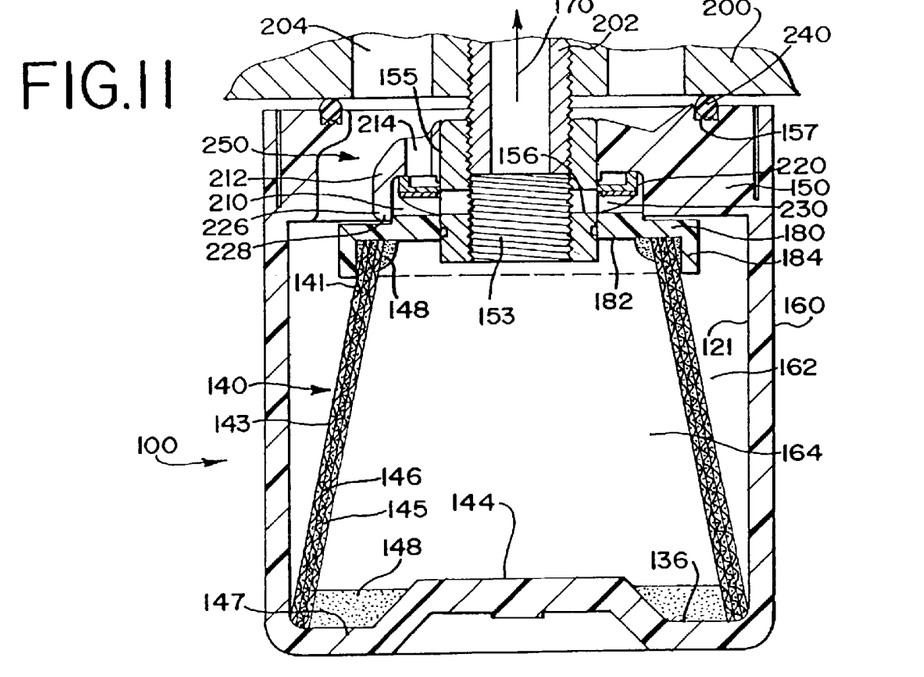
FIG. 11 is a cross-section view of the preferred embodiment.
Figure 12:
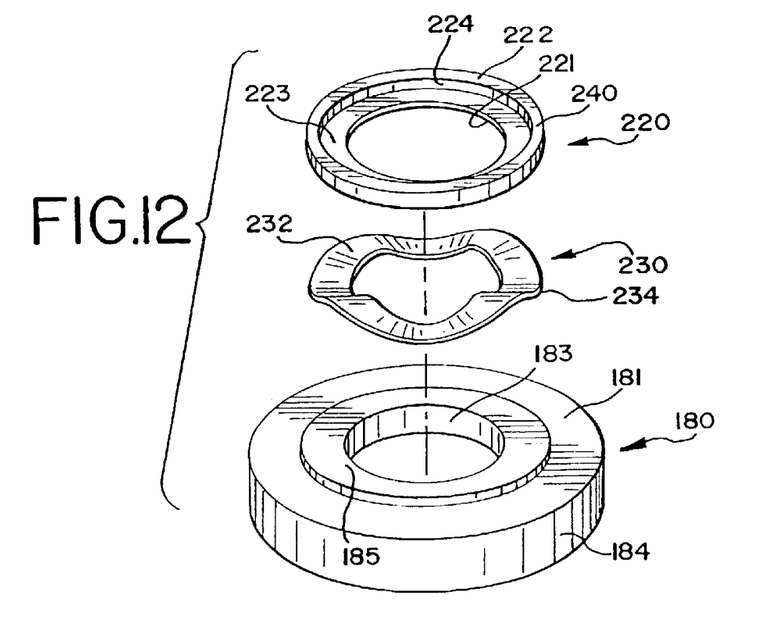
FIG. 12 is an exploded view of parts of the bypass valve of the preferred embodiment.

As illustrated in FIG. 6, which is a top view of filter 100, industrial fluid inlet 158 includes four openings 158 that are concentric with central bore 152. The four openings 158 are separated by bridges 159. The top member 150 includes a circular groove 157 formed in its upper or outer surface that receives a mating O-ring or other seal that functions to form a seal between the top member 150 and the distribution head (not shown). A distribution head 200 is shown in FIG. 11. The O-ring or other seal is contained in the circular groove 157 to assure a liquid seal between the top member 150 and the distribution head.

Figure 7:
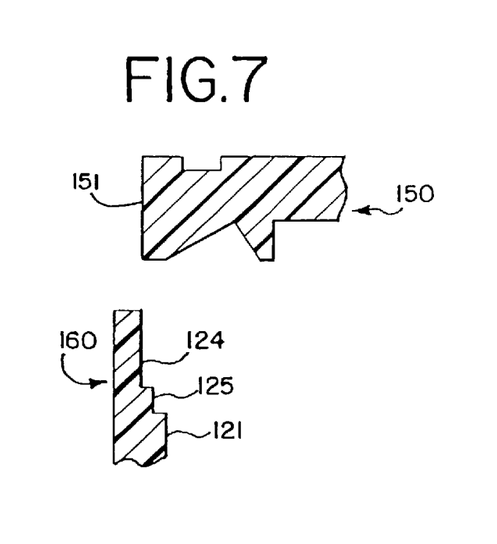
FIG. 7 is an enlarged cross-section view of the embodiment seen in FIG. 3 of the top member at a location spaced above the hollow polymeric container.

As is best seen in FIG. 7, the inner wall 121 of cup-shaped bottom-end portion 160 has a recessed rim 124 formed along its upper edge that has a larger diameter than inner wall 121. The peripheral edge 151 top member 150 has a diameter that is slightly smaller than the diameter of recessed rim 124 and, thus, the top member 150 can be lowered into the open-end of cup-shaped bottom-end portion 160 without interference. A band 125 of polymeric material having a diameter smaller than recessed rim 124 and larger than inner wall 121 is provided as a step between the bottom of recessed rim 124 and the inner wall 121. During assembly of the filter 100, as the top member 150 is lowered into cup-shaped bottom-end portion 160, the bottom surface of top member 150 encounters band 125 which prevents top member 150 from becoming fully seated in cup-shaped bottom-end portion 160. As will be discussed in more detail, this interference with band 125 will be overcome during the plastic welding process that secures the top member 150 to the cup-shaped bottom-end portion 160. Thus, when assembly is complete, the top member 150 will be fully seated in the open-end 122 of cup-shaped bottom-end portion 160, and member 150 and cup-shaped bottom-end portion 160 will have been bonded together as an integral member. As shall be further discussed, top member 150 is permanently secured to cup-shaped bottom-end portion 160 by a plastic weld.

Figure 8:
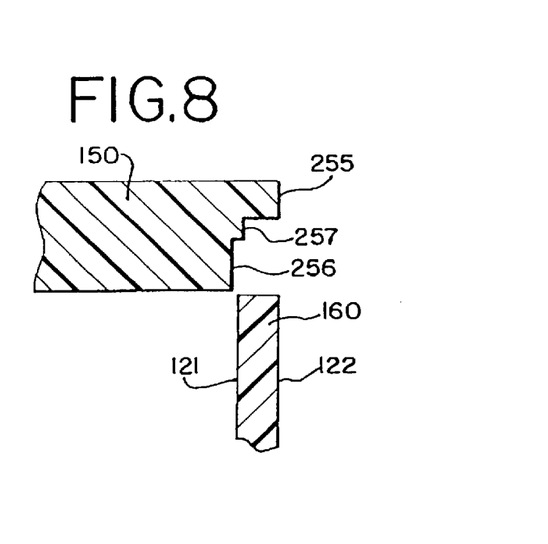
FIG. 8 is an enlarged cross-section view of a portion of the top member at a location spaced above the hollow polymeric container showing another embodiment of the connection between the top member and the hollow polymeric container.

Another embodiment for the bonding of the peripheral edge of top member 150 to the inner wall 121 of the cup-shaped bottom-end portion 160 is illustrated in FIG. 8. In this embodiment, the peripheral edge of top member 150 has an upper section 255 that has the same diameter as the outer diameter of the cup-shaped bottom-end portion 160 and a lower section 256 that is slightly smaller than the inner diameter of the cup-shaped bottom-end portion 160. This allows the lower section 256 of top member 150 to enter the open, upper end of the cup-shaped bottom-end portion 160 without interference. The peripheral edge of top member 150 includes a band portion 257 that has a diameter that is larger than the diameter of the lower section 256 and smaller than the diameter of the upper section 255. As the top member 150 is lowered into the cup-shaped bottom-end portion 160, the band portion 257 will encounter the upper edge of the cup-shaped bottom-end portion 160 and prevent the top member 150 from fully seating. At this point of the fabrication, the ultrasonic welding operation commences which melts the material forming the band portion 257 permitting the top member to completely seat in cup-shaped bottom-end portion 160 and form a bond therewith. This embodiment has the advantage that there will not be a resulting bead of weld on the upper surface of the top member 150 which could interfere with the attachment of the filter media assembly 100 to the distribution head.

An inner wall 121 and a floor 144 define the interior 142 of cup-shaped bottom-end portion 160. A circular groove 136 formed in floor 144. Groove 136, as illustrated in FIG. 4, is located at the intersection of wall 121 and floor 144 but could be spaced centrally of this intersection. Groove 136 serves to receive the lower or bottom edge 147 of the filter media assembly 140. Filter media assembly 140 may be fabricated of any filter medium commonly employed in the art, including but not limited to, stainless steel mesh, polyesters, or cellulose materials. Filter media assembly 140 has an outer screen 143 that is in fluid communication with the industrial fluid inlet 158 and an inner screen 145 that is in fluid communication with the industrial fluid outlet 153.

The filter media assembly 140 that is illustrated in FIGS. 4 and 5 and also in FIG. 11 formed from flat material that has been cut to a shape that includes a pair of edges. This discussion of the filter media assembly 140 applies equally to the embodiment, illustrated in FIGS. 3–8, as well as the embodiment illustrated in FIGS. 9–12. When the pair of edges are joined by a weld or encapsulated by adhesive, the flat piece of material assumes the shape of a cone. In the preferred embodiment, the material is stainless steel wire mesh which provides a filter media assembly that is stiff and will not be distorted or bent by fluid flow through it. The metal mesh material is folded or pleated radially such that the filter is in the shape of a truncated cone having wave-shaped continuous top and bottom edges. The radial pleats extend from the upper peripheral edge to the lower peripheral edge of the right circular cone-shaped filter. The pleats are formed such that their amplitude becomes greater as they progress from the upper periphery edge to the lower peripheral edge. As a result of forming these pleats and joining the edges, the flat pieces of material from which filter media assembly 140 formed assumes the shape of a frustum of a right circular cone. The surface area and, thus, the filtering capacity of the filter media assembly 140 are greatly increased as a result of the pleats. Furthermore, the rigidity and therefore the geometric integrity of the filter media assembly 140 are increased considerably as a result of the pleats. The filter media assembly illustrated in FIGS. 4 and 5 is comprised of three layers of woven mesh screens. The outer screen 143 and the inner screen 145 have a wire count of 40 to 60 wires per inch. The preferred embodiment of the outer 143 and inner 145 screens have 50 stainless steel wires per inch. These relatively sturdy, woven mesh outer screens function to provide structural integrity to the filter media and also to insure pleat separation of the middle, woven mesh screen 146 to avoid the pleats from compressing upon themselves. The openings in the inner and outer, woven mesh screens are much larger than the openings of the middle, woven mesh screen 146 and as a result the middle, woven mesh screen defines the porosity of the filter media assembly. The size of the openings in the middle mesh screen 146, for the preferred embodiment, are 25 microns. This mesh screen has a 47% porosity which means that 47% of its surface is open. Mesh screen 146 will retain particles that are larger than about 25 microns. Applicant has also used middle screens 146 that have openings of about 17 microns. The 17 micron screen has a porosity of 37%. The openings in the middle mesh screen 146 must be very small in the range of 15–30 microns. Thus, the middle layer of filter media assembly 140 functions as the filtering layer, and the inner layers 145 and outer layers 143 function to provide structural integrity and to insure pleat separation of the middle layer.

In the assembly process, the upper edge 141 of filter media assembly 140 is secured to the lower surface of disc-shaped filter mounting plate 180 using bonding material 148. Bonding material 148 is then place in groove 136 formed in floor 144. The filter media assembly with the attached disc-shaped filter mounting plate 180 is then lowered into the cup-shaped bottom-end portion 160. The large or lower peripheral edge 147 of filter media assembly 140 approaches the groove 136 that contains bonding material 148. The top member 150 is then lowered into the open-end 122 of the cup-shaped bottom-end portion 160 and the adapter 154 enters the central aperture 183 of the mounting plate 180. As the top member 150 is lowered into the cup-shaped bottom-end portion 160, the band 125 (see FIG. 7) of polymeric material engages the bottom surface of top member 150. The top member 150 has been manufactured such that the diameter of its peripheral edge 151 is slightly smaller than the diameter of the rim 124 of the cup-shaped bottom-end portion 160. The top member 150 and the top end 122 of the cup-shaped bottom-end portion 160 is then subjected to an ultrasonic welder which melts the band 125 of polymeric material which enables the top member 150 to be forced downwardly into place in the cup-shaped bottom-end portion 160. The melted material of band 125 then forms a bond with the rim 124 of the inner wall 121 and the peripheral edge 138 of top member 150. During the ultrasonic welding, the raised concentric annulus of the upper surface of filter mounting plate 180 enters the open bottom of the chamber and closes the chamber. As a result, the top member 150 has been permanently secured to the cup-shaped bottom-end portion 160 to form the housing 120. Another result is that the bottom edge of filter media assembly 140 has been permanently secured in the groove 136 and the collector plate 180 has been joined to the top member 150 as an integral part thereof. Since the top edge of filter media assembly 140 is bonded to the collector plate 180 when assembled, the top edge of filter media assembly 140 is bonded to the top member 150. Consequently, after assembly is completed, there can be no relative movement of filter media assembly 140 relative to the housing 120.

It should be noted that, although the filter media assembly 140 that is shaped as a right circular cone is preferred, filters having other shapes, for example tubular, could be used with this invention.

The large or bottom peripheral edge 147 of filter media assembly 140 is secured in groove 136 formed in floor 144 by an adhesive bonding material 148. This bonding permanently secures the lower edge 147 of the filter media assembly 140 to the cup-shaped bottom-end portion 160 such that there can be no relative movement therebetween.

The disc-shaped filter mounting plate 180 includes annular flanges 184 that extend downwardly from its peripheral edges. The upper peripheral edge 141 of the filter media assembly 140 is secured by epoxy bonding material 148 in the circular groove formed by flanges 184 of the disc-shaped filter mounting plate 180. When assembled, this bonding permanently secures the upper edge of the filter 140 to the top member 150 through the filter mounting plate 180 such that there can be no relative movement therebetween. Preferably, bonding material 148 is an epoxy resin.

The bonding material 148 used in the preferred embodiment is a one-part epoxy resin. Two part epoxy resins must be used soon after the two parts are combined which, in a production process as used in the manufacture of these filters, would require the continuous preparation of new batches. One part epoxy resin takes longer to set and, thus, a batch can be used for longer production runs. Another advantage in this particular application of a one-part epoxy resin is, since the one-part epoxy resin takes longer to set, it has time to settle to a smooth upper surface that does not have cracks and crevasses that can trap contaminates. A one-part epoxy resin sold under the trade name ECCO-BOND A-304 is available from Emerson and Cuming Specialty Polymers, a division of National Starch and Chemicals.

In the process of producing the parts that make up the filter 100, cup-shaped bottom-end portion 160, top member 150 and disc-shaped filter mounting plate 180 are manufactured using any process commonly employed in the art. Preferably, cup-shaped bottom-end portion 160, top member 150 and disc-shaped filter mounting plate 180 are manufactured by an injection molding process using long fiber polymer composite reinforced thermoplastic materials such as CELSTRAN®.

Ultrasonic plastic welding is the preferred plastic welding process. An ultrasonic plastic welding apparatus has one or more sonic horns. Each sonic horn has a generator-transducer for ultrasonically activating the horn and its welding blades. When the sonic horn is activated, vibrations in the range of 20,000 cycles per second are created producing heat which melts the plastic material being welded. After deactivation of the sonic horn, a permanent welded bond formed between the top member 150 and the cup-shaped bottom-end portion 160. This permanent bond locks the filter media assembly 140 in place within the now enclosed housing 120.

When filter 100 requires cleaning, it is removed from the distribution head and the excess lubricant is drained from it. Thereafter, a cleaning solution is injected into housing 120 in the direction opposite to the direction of filtration. For example, cleaning solution is directed into outlet 153. The injection of solution into outlet 153 effectuates the removal of particulates from filter media assembly 140 and transports the fluid entrained particles into the inlet section 162 and subsequently out fluid inlet 158. Alternatively, cleaning solution may be injected into industrial fluid inlet 158 to thereby cause the removal of particulate from filter media assembly 140 through the outlet 153. After cleaning, filter 100 is dried and reused.

Referring now to FIGS. 9 through 12, the bypass valve 250 will be discussed. The bypass valve 250 illustrated in FIGS. 9 through 12 could be incorporated into the embodiment of the filters discussed above. The same reference numbers will be used in the following discussion when referring to filter parts that are the same as those parts previously discussed with reference to the embodiment of FIGS. 3–8.

Figure 9:
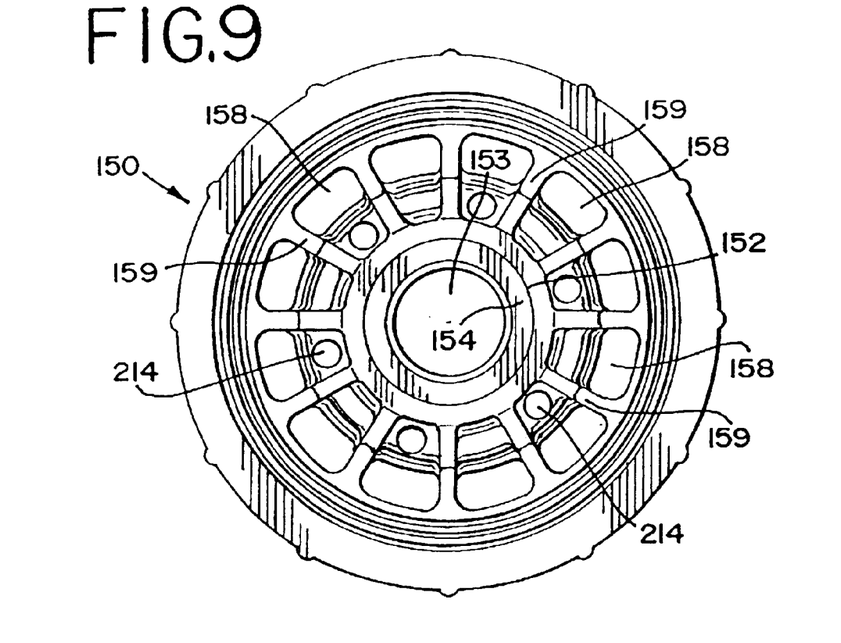
FIG. 9 is a top view of the top member for the preferred embodiment.
Figure 10:
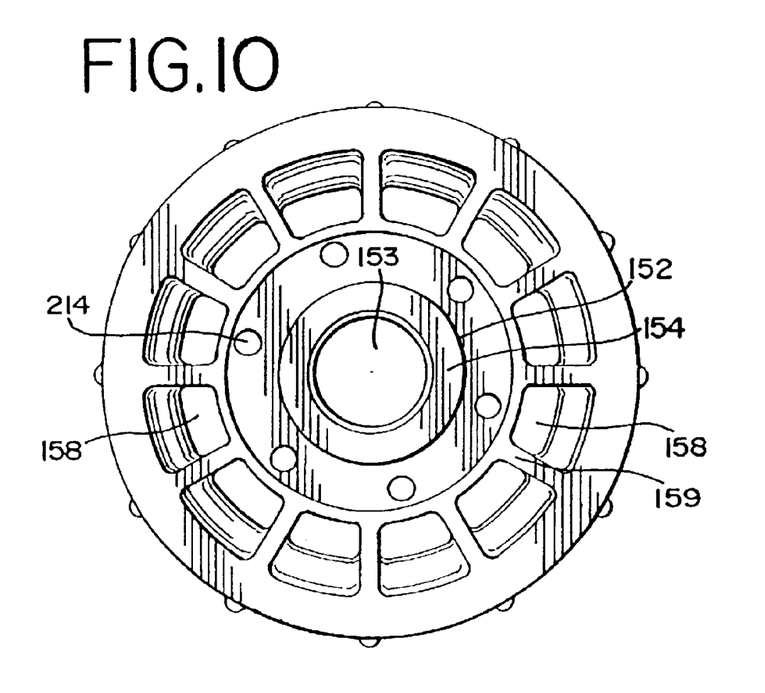
FIG. 10 is a bottom view of the top member for the preferred embodiment.

As best seen in FIGS. 9 and 10, top and bottom views respectfully of the top member 150, a circular bore 152 formed therein into which is secured an internally threaded metallic adapter 154. The internally threaded metallic adapter 154 is secured in a central circular bore 152 formed in top member 150 by bonding material 148 or by plastic welding. If it is to be secured by plastic welding, then the outer surface of threaded metallic adapter 154 is grooved or serrated to receive the liquid polymeric material during welding and, thus, lock the threaded metallic adapter 154 in place. A variety of internally threaded adapters 154 are available having internal threads that are sized to mate with a variety of distribution heads 200 commonly used in the industry, thereby enabling filter 100 to be employed in a variety of industrial applications.

The distribution head 200, as best seen in FIG. 11, includes an externally threaded conduit 202 that mates with the internally threaded adapter 154. The filtered fluid exits the filter 100 through the industrial fluid outlet 153 from which it flows into conduit 202 of the distribution head 200. Arrow 170, seen in FIG. 11, indicates the direction that the industrial fluid flows as it exits filter 100. The fluid to be filtered flows from conduit 204 of distribution head 200 into filter 100 through the industrial fluid inlet 158 formed in top member 150.

As best seen in FIG. 9, industrial fluid inlet 158 includes twelve openings that are concentric with central bore 152. The twelve openings are separated by bridges 159. As best seen in FIG. 11, top member 150 includes a circular groove 157 formed in its upper or outer surface that receives a mating O-ring 240 or other seal that functions to form a seal between the top member 150 and the distribution head 200. The O-ring or other seal 240 is contained in the circular groove 157 to assure a liquid seal between the top member 150 and the distribution head 200.

A chamber 210 formed in top member 150 which is isolated from the industrial fluid inlet 158 by wall 212 formed of the polymeric material of the top member 150. Another wall of the chamber 210 is defined by the outer surface 155 of metal adapter 154. The chamber 210 has openings 214 formed in the polymeric walls 212 that provide communication between chamber 210 and the industrial fluid inlet 158. A series of openings 156 are formed through metal adapter 154 providing communication between the industrial fluid outlet 153 and chamber 210. A spring-biased base plate 220 having a central opening 221 and an annular shoulder 222 is located within chamber 210. Central opening 221 is sized to closely receive adapter 154 and functions as a guide for the spring-biased base plate 220. The annular shoulder 222 extends upward around the periphery of the base plate 220 and terminates in a peripheral edge 224. Spring-biased base plate 220 functions as the opening and closing member for bypass valve 250 and is guided during its opening and closing movement by sliding along its central opening 221 along the outer surface of metal adapter 154. This sliding arrangement of the spring-biased base plate enables its peripheral edge 224 to always lay in a plane that is parallel to the top surface of the chamber 212 and thus insure full closure of the bypass valve 250. When the spring-biased base plate 220 is forced up by the spring 230, it slides along the outer surface 155 of adapter 154 and is stopped when the peripheral edge 224 engages the top surface of the chamber 210. Peripheral edge 224 engages the top wall of chamber 210 outwardly of the openings 214 formed in the wall 212. Between the annular shoulder 222 and the central opening 221 there is a flat annulus 223 that has a substantial area. When the spring-biased base plate 220 is in the fully raised position, it functions to effectively close the openings 214. The fluid to be filtered that enters the filter 100 through the industrial fluid inlet 158 flows through openings 214 and exerts pressure on the flat annulus surface 223 of the spring-biased base plate 220. When the pressure on surface 223 exceeds the upward pressure of the spring 230, the spring-biased base plate 220 moves downwardly. As the central opening 221 in the spring-biased base plate encounters the openings 156 formed in the adapter 154, inlet fluid flows through openings 156 into the industrial fluid outlet 153 and thus bypasses the filter media assembly 140. Since some inlet fluid may also be flowing through filter media assembly 140, the spring-biased base plate 220 will move down only enough to allow the bypass of sufficient fluid to maintain the inlet pressure at a predetermined acceptable level. If the pressure of the inlet fluid is sufficiently high, the spring-biased base plate 220 will continue to move downward until the openings 156 are fully open. When openings 156 are fully opened, the entire inlet oil stream can bypass the filter media assembly 140.

The polymeric wall 212 forming chamber 210 includes an annular portion 226 that extends downward from the top surface of the chamber 210. Annular portion 226 is concentric with the outer surface of said metal adapter 154 and terminates in a peripheral edge 228. Peripheral edge 228 is located at the level of the bottom surface of top member 150. The bottom edge of metal adapter 154 extends downward beyond the bottom surface of top member 150 and peripheral edge 228.

A disc-shaped filter mounting plate 180 is provided that has an upper surface 181, a lower surface 182 and a central aperture 183 that is sized to closely receive the outer surface of metal adapter 154. The peripheral edge 228 of the annular portion 226 engages the upper surface 181 of disc-shaped filter mounting plate 180. Thus, disc-shaped filter mounting plate 180 functions as the bottom surface of chamber 210.

The upper surface 181 of collector member 180 has a raised concentric annulus 185 around the central bore 183 that seats in the chamber 210 formed by the polymeric walls 212 of top member 150. The filter media assembly 140 is secured by an adhesive bonding material 148 along its bottom or closed-end portion edge 147 to annular groove 136 formed in the floor 144. When the filter collecting member 180 is seated in chamber 210, its lower surface 182, defined by the downward extending flange 184 and central aperture 183, is located between the industrial fluid outlet 153 and inlet 158 both formed in top member 150. When filter media assembly 140 is secured in place within filter 100 it isolates the industrial fluid outlet 153 from the industrial fluid inlet 158. As a consequence of this isolation, the industrial fluid that enters the inlet section 162 of filter 100 through the industrial fluid inlet 158 must pass through the filter media assembly 140 to reach the discharge section 164 from which it is discharged through industrial fluid outlet 153.

Wave type spring member 230 is washer-shaped and has axially radiating high ridges 232 and low ridges 234 extending around its periphery. The high ridges 232 engage the bottom surface of the spring-biased base plate 220 and the low ridges 234 support the spring member 230 on the upper surface of the raised concentric annulus 185 of the filter collector member 180. Spring 230 is generally in the form of a Belville washer, a device commonly used as a thrust element, the structure and function of which will be readily appreciated by those skilled in the art. As incorporated into the immediate invention, wave spring member 230 is sized such that, as the inlet pressure increases, it can compress which results in a slight increase in its diameter. Spring member 230 exerts a uniform pressure on the spring-biased base plate 220 over the full range of its expansion. This is important since spring-biased base plate 220 functions as the opening and closing member for the bypass valve 250.

It should be understood that the foregoing disclosure is illustrative of the broad inventive concepts comprehended by this invention and that various other modifications and improvements may be made to the invention without departing from the spirit of the disclosed concept.

What is claimed is:

1. A method of cleaning the filter element of a renewable filter for filtering industrial fluids of the type comprising:
    a housing:
        said housing comprising a hollow polymeric container having a closed-end and an open-end, said housing also including an open-end top member;
        said open-end top member being dimensioned and shaped to close said open-end of said hollow polymeric container;
        said open-end top member having an industrial fluid inlet formed therein through which industrial fluid to be filtered enters said housing;
        said open-end top member having an industrial fluid outlet formed therewith through which filtered industrial fluid exits said housing;
        said open-end top member having an annular groove formed in a lower surface thereof and positioned radially between said industrial fluid inlet and said industrial fluid outlet.
    a corrugated filter element disposed within said hollow polymeric container, said filter element having an inlet surface that is in fluid communication with said industrial fluid inlet and an outlet surface that is in fluid communication with said industrial fluid outlet, said inlet and outlet surfaces formed of sturdy corrugated screens that support and protect an intermediate corrugated fine mesh screen such that the filter element will retain contaminants carried by the industrial fluid as industrial fluid passes through said filter element;
    said filter assembly formed from three layers of metal mesh material, the outer and inner layers being sturdy screens having wire count in the range of 40–60 wires per inch and the middle screen being a fine screen having openings in the range of 15–30 microns;

said filter element including an endless closed-end portion edge and an endless open-end portion edge;

a filter collector received in said annular groove;

said endless closed-end portion edge is bonded, along its entire extent, to the closed-end of said hollow polymeric container and said endless open-end portion edge is bonded along its entire extent to a downwardly facing surface of said filter collector such that it surrounds said industrial fluid inlet formed therein and isolates said industrial fluid inlet from said industrial fluid outlet;

the material for bonding the endless closed-end portion edge and the endless open-end portion edge being a one part epoxy resin that can withstand operating temperatures between approximately −40° C. and 190° C.;

said open-end top member being permanently secured to said hollow polymeric container about said open-end such that said filter element is permanently fixed to and unmovable relative to said hollow polymeric container; and a mounting attachment carried by said open-end top member for mounting said renewable filter to a source of industrial fluid to be filtered and to a filter cleaning mechanism; comprising the steps of:

draining any industrial fluid from said renewable filter;

supplying a pressurized cleaning solution to said housing through said industrial fluid outlet; and allowing said pressurized cleaning solution to escape from said housing through said industrial fluid inlet, such that said pressurized cleaning solution dislodges and flushes out through said industrial fluid inlet said retained contaminants that are held by said filter element.

2. A method of cleaning the filter element of a renewable filter for filtering industrial fluids of the type comprising:

a housing:

said housing comprising a hollow polymeric container having a closed-end and an open-end, said housing also including an open-end top member;

said open-end top member being dimensioned and shaped to close said open-end at said hollow polymeric container;

said open-end top member having an industrial fluid inlet formed therein through which industrial fluid to be filtered enters said housing;

said open-end top member having an industrial fluid outlet formed therewith through which filtered industrial fluid exits said housing;

said open-end top member having an annular groove formed in a lower surface thereof and positioned radially between said industrial fluid inlet and said industrial fluid outlet;

a corrugated filter element disposed within said hallow polymeric container, said filter element having an inlet surface that is in fluid communication with said industrial fluid inlet and an outlet surface that is in fluid communication with said industrial fluid outlet, said inlet and outlet surfaces formed of sturdy corrugated screens that support and protect an intermediate corrugated fine mesh screen such that the filter element will retain contaminants carded by the industrial fluid as industrial fluid passes through said filter element;

said filter assembly formed from three layers of metal mesh material, the outer and inner layers being sturdy screens having wire counts in the range of 40–60 wires per inch and the middle screen being a fine screen having openings in the range of 15–30 microns;

said filter element including an endless closed-end portion edge and an endless open-end portion edge;

a filter collector received in said annular groove;

said endless closed-end portion edge is bonded, along its entire extent to the closed-end of said hollow polymeric container and said endless open-end portion edge is bonded along its entire extent to a downwardly facing surface of said filter collector such that it surrounds said industrial fluid inlet formed therein and isolates said industrial fluid inlet from said industrial fluid outlet;

the material for bonding the endless closed-end portion edge and the endless open end portion edge being a one part epoxy resin that can withstand operating temperatures between approximately −40° C. and 190° C.;

said open-end top member being permanently secured to said hollow polymeric container about said open-end such that said filter element is permanently fixed to and unmovable relative to said hollow polymeric container; and a mounting attachment carried by said open-end top member for mounting said renewable filter to a source of industrial fluid to be filtered and to a filter cleaning mechanism; comprising the steps of:

draining any industrial fluid from said renewable filter;

supplying a pressurized cleaning solution to said housing through said industrial fluid inlet; and allowing said pressurized cleaning solution to escape from said housing through said industrial fluid outlet, such that said pressurized cleaning solution dislodges and flushes out through said industrial fluid outlet said retained contaminants that are held by said filter element.

* * * * *